United States Patent
Wartanessian

[11] Patent Number: 5,135,659
[45] Date of Patent: Aug. 4, 1992

[54] AGRICULTURAL WASTE WATER TREATMENT

[75] Inventor: Sukas Wartanessian, Glendale, Calif.

[73] Assignee: Atochem North America, Inc., Philadelphia, Pa.

[21] Appl. No.: 704,752

[22] Filed: May 23, 1991

[51] Int. Cl.$^5$ .............................................. C02F 9/00
[52] U.S. Cl. .................... 210/666; 210/669; 210/694
[58] Field of Search ............ 210/666, 669, 694, 259, 210/265, 266

[56] References Cited

U.S. PATENT DOCUMENTS

| | | | |
|---|---|---|---|
| Re. 28,807 | 5/1976 | Panzer et al. | 260/2 BP |
| Re. 28,808 | 5/1976 | Panzer et al. | 260/2 BP |
| Re. 29,241 | 5/1977 | Dajani | 210/54 |
| Re. 29,908 | 2/1979 | Fowler et al. | 210/51 |
| 3,009,873 | 11/1961 | Kerr et al. | 210/53 |
| 3,455,820 | 7/1969 | Joyce et al. | 210/694 |
| 3,484,837 | 12/1969 | Odom et al. | 210/52 |
| 3,849,307 | 11/1974 | Grundner | 210/54 |
| 3,875,111 | 4/1975 | Tsuda et al. | 260/47 |
| 3,928,448 | 12/1975 | Ballweber et al. | 260/567.6 P |
| 3,933,717 | 1/1976 | Shinohara et al. | 260/29.6 |
| 4,163,718 | 8/1979 | Chamberlin et al. | 210/54 |
| 4,224,150 | 9/1980 | Buriks et al. | 210/735 |
| 4,668,403 | 5/1987 | Walterick, Jr. et al. | 210/666 |
| 4,668,404 | 6/1987 | Walterick, Jr. | 210/666 |

OTHER PUBLICATIONS

Morton Thiokol Inc., "Organic Specialty Chemicals", Project Manual SC-61B.

Glaser, Howard & Edzwald, James K., Environmental Science & Technology, vol. 13, Number 3, Mar. 1979, 299–305, "Coagulation and Direct Filtration of Humic Substances with Polyethylenimine".

*Primary Examiner*—Ivars Cintins

[57] ABSTRACT

An integrated apparatus and a process for precipitation and charcoal absorption of pesticide residues in agricalatural waste water solutions are disclosed.

6 Claims, 1 Drawing Sheet

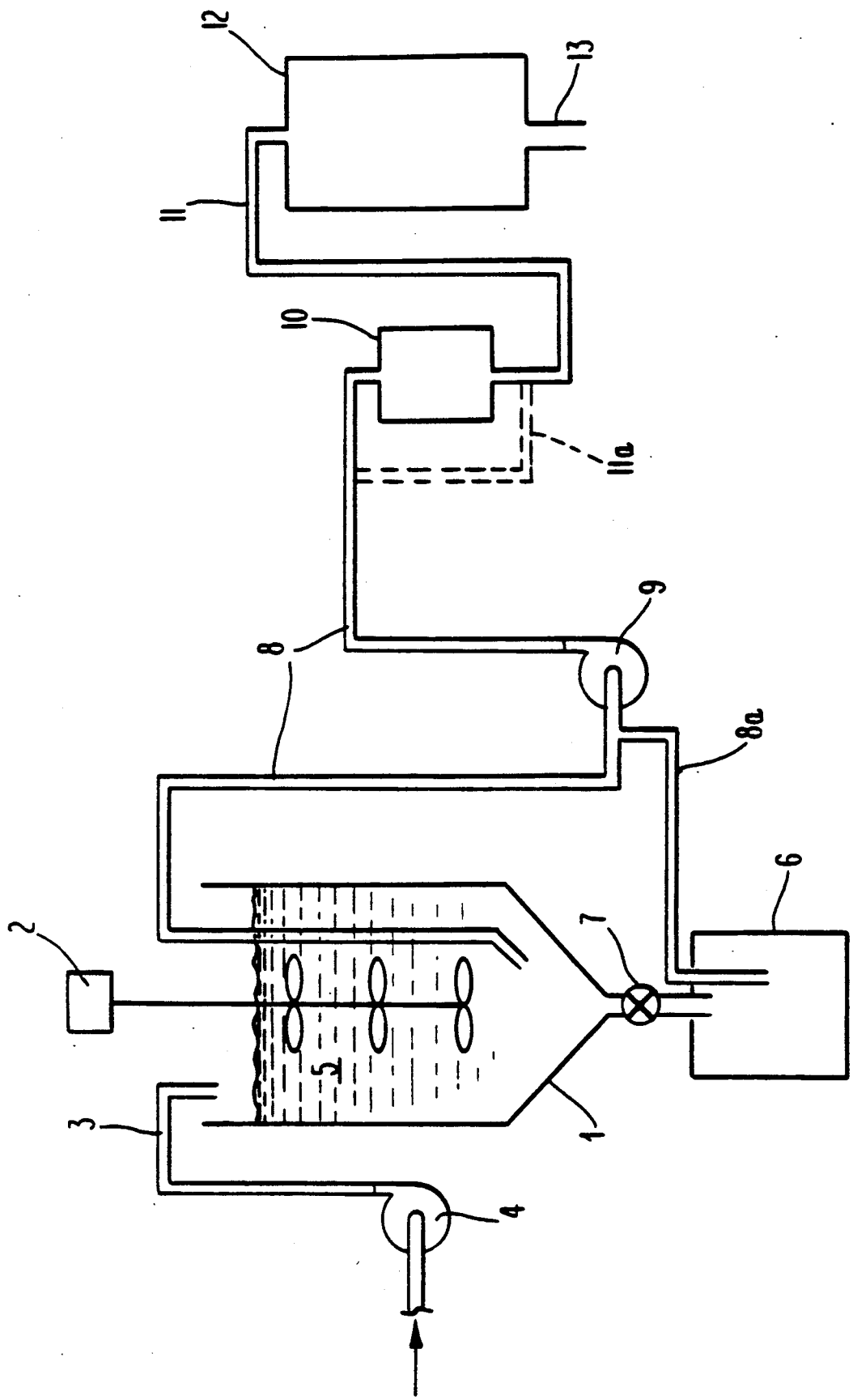

AGRICULTURAL WASTE WATER TREATMENT

BACKGROUND OF THE INVENTION

This invention relates to processes in the art of chemistry which concentrate and remove organic pesticide residues which are suspended or dissolved in spent aqueous treatment solutions for agricultural products, and to apparatus designed for carrying out said processes. After harvesting, fruits and vegetables are treated with various pesticide chemicals in solution to control various diseases caused by plant pathogens (both bacterial and fungal). Such treatments permit longer term storage and are normally applied by drenching or dipping. These pesticide containing solutions are normally aqueous and after use in treatment are considered hazardous waste with the attendant problems both economic and practical for their disposal. The problems are exacerbated by the high volumes of the solutions and the dilute concentrations of the pesticides contained in them.

It has been found that for waste water comprising spent aqueous solutions from apple treatment containing the anti scald agents diphenylamine or 6 ethoxy-1,2-dihydro-2,2,4-trimethyl quinoline (ethoxyquin) along with other dissolved and suspended organic matter, use of particular flocculating agents followed by separation of the supernatant liquid from the flocculated material and subsequent treatment of the supernatant liquid with activated charcoal results in a significant removal of the diphenylamine or ethoxyquin from the liquid together with a significant reduction of much of the other organic materials.

DESCRIPTION OF THE PRIOR ART

Glaser, et al. in Environmental Science and Technology, Vol. 13, pp 299–305 (1979) discuss the removal of humic substances from fresh water entering a water treatment plant through the use of polyethyleneimine flocculants. Although humic substances may be present in spent agricultural treatment solutions, they are chemically different species from the pesticide residues which are the subject of the present application. Other methods suggested for clarification and color removal from influent waters include treatment with activated carbon and various cationic amine containing polymers as taught in U.S. Pat. Nos. 4,668,403 and 4,668,404.

U.S. Pat. No. 4,163,718 teaches removal of phenolics from waste water using arylated polyamines as flocculating agents.

U.S. Pat. No. 3,484,837 teaches use of urea modified cationic amine containing resins for waste water treatment particularly for removal of alkyl sulfonate and alkylbenzene sulfonate detergents.

The use of various cationic amine polymers both singly and in mixtures for removal of impurities suspended or dissolved in water are taught by U.S. Pat. Nos. Re 28,807; Re 28,808; Re 29,241; Re 29,908; 3,009,873; 3,849,307; 3,875,111; 3,928,448; 3,933,717; and 4,224,150. None of these patents teach or suggest the use of any type of cationic amine polymer in removing the pesticides dealt with by the present invention from aqueous solution or suspension.

SUMMARY OF THE INVENTION

The invention provides a process for the removal of anti-scald agents selected from the group consisting of diphenylamine, 6-ethoxy-1,2-dihydro-2,2,4-trimethyl quinoline and mixtures thereof together with other dissolved and suspended organic matter resulting from the post harvest treatment of fruit which comprises:

a) treating said waste water with a ethoxylated polyethyleneimine flocculating agent to form a precipitate and a supernatant liquid.

b) substantially separating the precipitate and the supernatant liquid formed in step (a) above; and c) treating the supernatant liquid separated in step (b) above with activated charcoal.

The process of the invention provides, effluent water which is substantially clear and colorless to slightly yellow and which meets or exceeds applicable discharge standards for the pesticide residues originally contained therein.

Special mention is made of processes for treating waste water wherein the other dissolved and suspended organic matter comprises other pesticide chemicals employed to treat the fruit before and after harvest.

Special mention is also made of processes wherein the fruit comprises apples or pears.

The invention also provides an integrated apparatus for the removal of anti-scald agents and other dissolved and suspended organic matter from waste water resulting from the post harvest treatment of fruit comprising:

a. means for treating said waste with a flocculating agent to form a precipitate and a supernatant liquor;

b. means communicating with the treating means of step a for substantially separating said supernatant liquor from said precipitate; and c. means communicating with the separating means of step b for treating said separated supernatant liquor with activated charcoal.

BRIEF DESCRIPTION OF THE DRAWING

The drawing illustrates schematically an apparatus suitable for the practice of the process of the invention.

DETAILED DESCRIPTION OF THE PREFERRED EMBODIMENT OF THE INVENTION

In describing the practice of the process of this invention and of the apparatus for its practice, reference will be made to the Drawing wherein the various means of the apparatus are numbered for identification schematically and which illustrates schematically the stages and sequence of the process.

Referring now to the drawing, waste water remaining after immersion or spray washing of harvested fruit, preferably apples or pears, containing up to about 2000 parts per million (ppm) diphenylamine and up to about 3000 ppm 6-ethoxy-1,2-dihydro-2,2,4-trimethylquinoline as well as dirt, humic matter and debris carried by the fruit together with residues from any pesticides which may have been applied to the fruit either before or after harvest is introduced into tank 1 equipped with agitation means 2 through conduit means 3 optionally with the aid of optional inlet pump means 4. Conduit means 3 is connected directly or indirectly through pump 4 to a standard waste water reservoir of a standard fruit washing apparatus (both not shown). After the desired quantity of waste water 5 is introduced into tank 1, from about 0.5 to about 3, preferably from about 0.5 to about 2.0 parts per hundred by volume of an about 2–5% preferably about 4.0% solids aqueous solution of ethoxylated polyethyleneimine is added, employing any convenient conventional means (not shown), conveniently while employing agitation means 2 to supply sufficient agitation to assure complete mixing. Once mixing is complete the floc or precipitate formed is permitted to settle to the lower portion of tank 1 from which it may be drained into receiver 6 through valve 7 either before or after the supernatant liquid is removed through conduit 8 with the aid of pump means 9. Further dewatering of the precipitate may occur in receiver 6 through additional settlement. Additional supernatant liquor so obtained may be removed from receiver 6 through conduit 8a and combined with the supernatant liquid through connection with conduit 8. Conduit 8 may optionally communicate with optional filter means 10 to insure substantially complete removal of all precipitate from the supernatant liquor. Supernatant liquor exiting from optional filter means 10 passes through conduit 11 into charcoal treatment means 12.

If filter means, 10 is not employed, conduit 8 may be connected directly to charcoal treatment means 12. If filter means 10 is normally employed, but is desired to be temporarily bypassed for any convenient reason, optional conduit 11a, shown by dotted lines, may be used as a bypass by employing suitable valving means (not shown). Charcoal treatment means 12 conveniently comprises prepackaged activated carbon in canisters. Sufficient charcoal is employed in a treatment cycle to insure that the water exiting through conduit 13 contains no more than the desired maximum concentration of the originally contained diphenylamine or 6-ethoxy 1,2-dihydro-2,2,4-trimethylquinoline. At this stage, the water will be colorless to slightly yellow with the concentration of pesticides originally contained not exceeding applicable discharge standards for discharge through conduit 13 to conventional waste water treatment facilities (not shown). Conventional analytical techniques well known in the art may be employed to monitor concentrations of the anti-scald agents and other pesticides in the waste water exiting through conduit 13 so that charcoal replacement may be accomplished with sufficient frequency to insure continuous removal of pesticides at the appropriate levels.

One of skill in the art will recognize that a wide variety of pesticide residues may remain on fruit after application in other pre-or post-harvest treatment of the fruit. Among these may be residual amounts of [1,2-phenylene-bis/iminocarbono-thioyl)]-bis carbamic acid dimethyl ester (thiophanate-methyl), 1H-benzimidazol-2-yl carbamic acid methyl ester (MBC), 2-(4-thiazolyl)-1H-benzimidazole (TBZ), 6,7,8,9,10,10-hexachloro-1,5,5a,6,9,9a-hexahydro-6,9,methano- 2,4,3-benzodioxathiepin-3-oxide, Endosulfan I & II.

One of skill in the art will recognize that the apparatus illustrated specifically for use with polyethyleneimine flocculent removal of anti-scald agents for apples and citrus fruit and other residual pesticides will be generally useful in the precipitation clarification of agricultural waste waters in general where it is desired to perform such treatment followed by an activated charcoal treatment step.

One of skill in the art will also recognize that waste water from certain agricultural treatments which contain high concentrations of inorganic electrolytes such as calcium chloride should be avoided.

The following examples further illustrate the best mode contemplated by the inventors.

EXAMPLE 1

This example compares the effect of flocculation using ethoxylated polyethyleneimines in removing diphenylamine and other pesticides with removal of diphenylamine by certain other known flocculants.

Aliquot portions of aqueous solutions or suspensions of the ingredients tabulated in the concentrations shown are treated with the flocculants shown. When a flocculent is in solution, 0.01 ml. of the amount of solution having the percentage concentration by weight shown is added to each 1 ml. of the solution to be treated.

The concentration of ingredient remaining in the supernatant liquid after settling of the precipitate is determined by standard HPLC methods and is tabulated.

| Ingredient in solution | Concentration (ppm) | Flocculating Agent | Quantity | Conc. in Supernatant Liquid (ppm) |
| --- | --- | --- | --- | --- |
| Diphenylamine | 2,000 | EPEI[1] | 3.7% solution | 150 |
| Diphenylamine | 2,000 | EPEI[2] | 3.7% solution | 150 |
| Diphenylamine | 2,000 | Starch EPEI[1] | .05 g/ml 3.7% solution | 170 |
| Diphenylamine | 2,000 | FeSO$_4$ EPEI$_1$ | 0.05 g/ml 3.7% solution | 2000 |
| Diphenylamine CaCl$_2$ | 2,000 30,000 | EPEI[1] | 3.7% solution | 2000 |
| Diphenylamine Compound D[3] | 2,000 600 | EPEI[1] | 3.7% solution | 77 |
| Compound E[4] | 2,700 | EPEI[1] | 3.7% solution | 180 |
| Diphenylamine | 2,000 | POAG[5] | 3.3% | 999* |
| Diphenylamine | 2,000 | OAPhR[6] | 3.3% | 393* |
| Diphenylamine | 2,000 | PEI[7] | 3.3% | 189* |

Footnotes
[1] ethoxylated polyethyleneimine Mol Wt. 40,000 to 60,000
[2] ethoxylated polyethyleneimine Mol. Wt. 60,000 to 80,000
[3] [1-[(Butylamino) carbonyl]-1H-benzimidazol-2yl) carbamic acid methyl ester.
[4] 6-ethoxy-1,2-dihydro-2,2,4-trimethyl quinoline (used on pears)
[5] polyoxyalkylene glycol
[6] oxyalkylated phenolic resin
[7] polyethyleneimine
*hazy supernatant liquid

EXAMPLE 2

This example illustrates the removal of diphenylamine and [1,2-phenylene bis(iminocarbonothioyl)] bis carbamic acid dimethyl ester (thiophonate methyl, compound A) from dilute aqueous solution.

Compound A (3.84 g) and diphenylamine (20 ml of a 31% weight by weight solution in water) were added to water (3.2 L) and thoroughly mixed. This solution also contains a small, unquantified amount of 1H-benzimidazol-2yl-carbamic acid methyl ester (MBC), compound B) because of hydrolytic reaction of compound A. After 15 minutes an aqueous solution of an ethoxylated polyethyleneimine of about 40,000 to 60,000 molecular weight and having about 80% of the available amine hydrogens converted to hydroxyethyl groups (32 ml of a 3.7% by weight aqueous solution) is added while continuing to stir. After stirring for an additional 15 minutes, agitation was stopped and the flocculent precipitate formed was allowed to settle. Portions of the supernatant liquid were analyzed for diphenylamine, compound A and Compound B by high pressure liquid chromatography (HPLC) using standard methods capable of detecting at least 0.05 ppm. pH was also determined. A 200 ml. aliquot of the supernatant liquid was treated with activated charcoal (20 g) by stirring with the charcoal for one hour and then removing it by filtration.

Analysis similar to those performed on the original supernatant liquor were performed on the filtrate.

The results are as follows:

| Ingredient | Original Solution (calculated ppm) | Supernatant Solution (observed ppm) | Charcoal Treated (observed ppm) |
|---|---|---|---|
| Diphenylamine | 2,000 | 190.0 | not detected |
| Compound A | 840 | 22.2 | not detected |
| Compound B | not checked | 12.3 | not detected |
| pH | not checked | 7.7 | 8.2 |

EXAMPLE 3

This example illustrates the removal of diphenylamine and 2-(4-thiazolyl)-1H-benzimidazol (TBZ), compound C) from aqueous solution by precipitation and charcoal treatment.

Following a procedure similar to that described in Example 2 but substituting Compound C at a 500 ppm level for compound A, the results found were:

| Ingredient | Original Solution (calculated ppm) | Supernatant Solution (observed ppm) | Charcoal Treaated Solution (observed ppm) |
|---|---|---|---|
| Diphenylamine | 2,000 | 195.0 | not detected |
| Compound C | 500 | 25.0 | 0.16 |
| pH | not checked | 8.2 | 8.2 |

EXAMPLE 4

This example illustrates treatment of a spent solution from washing fruit (apples) with ethoxylated polyethyleneimine followed by charcoal treatment.

Waste water (240 gallons) from treating harvested fruit was placed in a tank and stirred for 10 minutes with 2.4 gallons of a solution of ethoxylated polyethyleneimine prepared by diluting a 38% by weight solution 1 to 9 by volume with water. Agitation is then stopped and the precipitate formed is allowed to settle. The supernatant liquid is then treated with charcoal.

The amount of diphenylamine present in each stage of the process is determined by standard HPLC techniques.

The results are as tabulated.

| Stage | Diphenylamine (ppm) | pH | Total % Solids | Odor | Color |
|---|---|---|---|---|---|
| Spent solution | 1745 | 6 | 0.53 | foul | Greenish Blue |
| Supernatant | 53.6 | 7 | 0.28 | foul | Dk. Yellow sl. haze |
| Precipitate Sludge | 19550 | 7 | 6.1 | foul | Dark grey (black) |

-continued

| Stage | Diphenylamine (ppm) | pH | Total % Solids | Odor | Color |
|---|---|---|---|---|---|
| Charcoal filtrate | 0 to 0.1 | 9 | 0.1 | none | colorless to slightly yellow |

EXAMPLE 5

Following the general procedure of Example 2 spent waste water from a fruit drencher operation was treated with ethoxylated polyethylenimine. The results are as tabulated.

| Organo-Sample | Volume (gal) | diphenyl amine (ppm) | Organochlorides (ppb)* |
|---|---|---|---|
| Original liquid | 1,000 | 2,000 | 50 |
| Supernatant after ppt. | 900 | 100 | not detected |
| Clear liquid after charcoal | 900 | 2 | not detected |

(organochlorines were identified as Endosulfans I and II)
*parts per billion

The sludge from the precipitation contained about 30 to 35% w/w diphenylamine and 5 ppm of the organochlorine compounds and was disposed of with appropriate hazardous waste procedures.

The charcoal contained roughly 1 lb. of diphenylamine per 1,000 gallons of water treated.

We claim:

1. A process for the removal of anti-scald agents selected from the group consisting of diphenylamine, 6-ethoxy-1,2-dihydro-2,2,4-trimethylquinoline and mixtures thereof together with other dissolved and suspended organic matter from waste water resulting from the post-harvest treatment of fruit which comprises:

a. treating said waste water with an ethoxylated polyethyleneimine flocculating agent to form a precipate and a supernatant liquid;

b. substantially separating the precipitate and the supernatant liquid formed in step a above; and c. treating the supernatant liquid separated in step b above with activated charcoal.

2. A process as defined in claim 1 wherein the organic matter comprises other pesticide chemicals employed to treat the fruit before and after harvest.

3. A process as defined in claim 2 wherein the pesticide chemicals comprise [1,2-phenylenebis(iminocarbonothioyl)]-biscarbamic acid dimethyl ester, 1H-benzimidazol-2-yl-carbamic acid methyl ester, 2-(4-thiazolyl)-1H-benzimidazole, and 6,7,8,9,10,10-hexachloro-1,5,5a,6,9,9a-hexahydro-6,9-methano-2,4,3-benzodioxathioxathiepin-3-oxide.

4. A process as defined in claim 1 wherein the fruit is selected from the group consisting of apples and pears.

5. A process as defined in claim 4 wherein the fruit is apples.

6. A process as defined in claim 4 wherein the fruit is pears.

* * * * *